United States Patent [19]
Louth et al.

[11] 3,938,041
[45] Feb. 10, 1976

[54] TAPE PACK DIAMETER MEASUREMENT MEANS AND METHOD

[75] Inventors: Kenneth Louth, Menlo Park; Reginald William Oldershaw, San Jose, both of Calif.

[73] Assignee: Ampex Corporation, Redwood City, Calif.

[22] Filed: June 21, 1973

[21] Appl. No.: 371,975

[52] U.S. Cl. .......................... 324/158 R; 242/186
[51] Int. Cl.² .................. G01R 17/00; B65H 59/38
[58] Field of Search........ 324/158 R; 242/184, 186, 242/190; 318/457; 73/65

[56] References Cited
UNITED STATES PATENTS

| | | | |
|---|---|---|---|
| 3,462,659 | 8/1969 | Lee | 242/184 |
| 3,648,134 | 3/1972 | Audeh | 242/184 |
| 3,713,606 | 1/1973 | Van Pelt | 242/184 |
| 3,720,794 | 3/1973 | Dolby | 242/184 |

Primary Examiner—R. V. Rolinec
Assistant Examiner—Ernest F. Karlsen

[57] ABSTRACT

An unknown tape pack diameter is determined by measuring the inertia of the unknown tape pack and comparing the inertia with an inertia value representative of the inertia of a second tape pack of known diameter.

11 Claims, 8 Drawing Figures

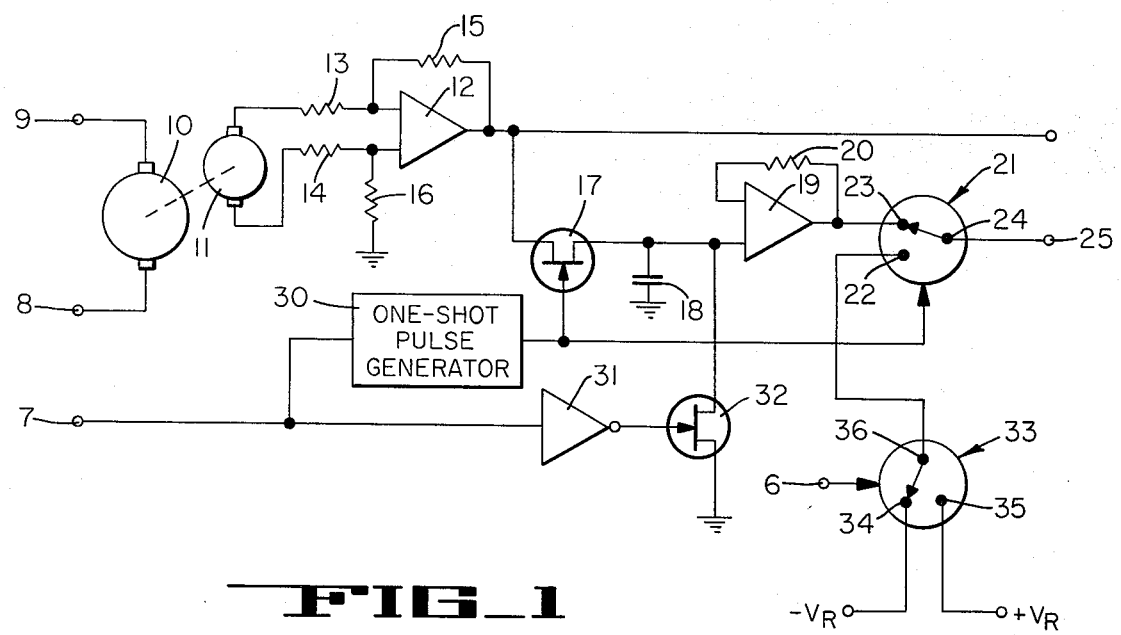
FIG_1
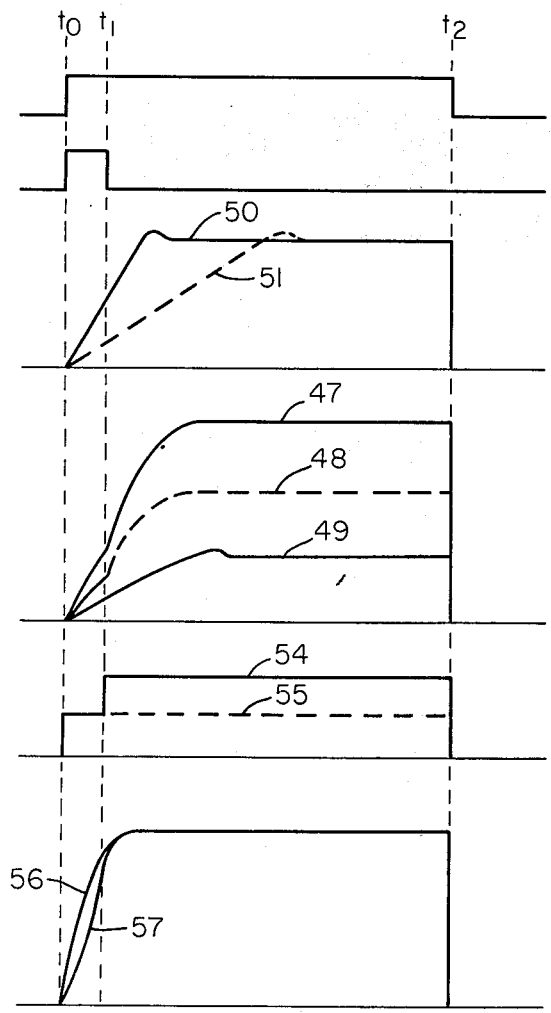
FIG_3A
FIG_3B
FIG_3C
FIG_3D
FIG_3E
FIG_3F

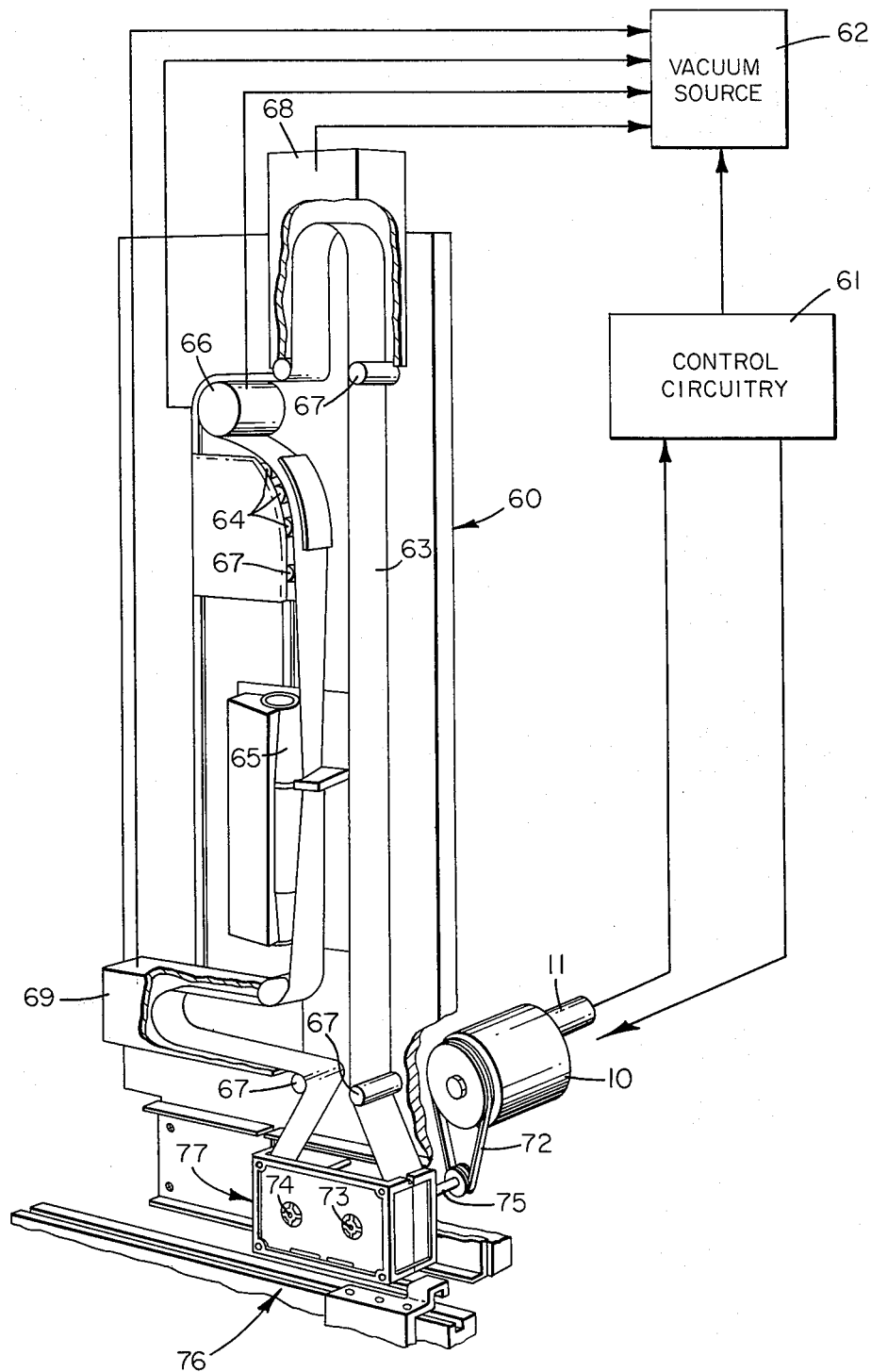
FIG_2

TAPE PACK DIAMETER MEASUREMENT MEANS AND METHOD

This invention relates to a means and method for measuring the tape pack diameter of a reel of tape and, more particularly, relates to a means and method for measuring the tape pack diameter of a reel of tape in an enclosed cassette.

Various mechanical and optical means have been devised to measure the amount of tape wound on a reel. These means have been generally suitable for measuring the diameter of tape on open reels but have proved impractical with enclosed cassettes and stereo cartridges. For example, mechanical arm followers have not been able to fit into cassettes to monitor tape pack diameter; optical systems are impeded by the cassette or cartridge cover. Visual indicators which can be used with see-through cassettes, such as the indicator disclosed in U.S. Pat. No. 3,630,170, are not suitable for electronic or automatic monitoring of tape pack diameter. Electronic schemes include a comparison between longitudinal tape speed and tape reel angular velocity to sense the approach of minimum tape pack diameter and a system for generating two pulse trains which are responsive to timing marks on a tachometer disc with a subsequent comparison of their phase difference to determine angular acceleration and velocity to sense when an angular velocity associated with minimum tape pack diameter is approached. These complex schemes are principally used for end of tape sensing.

Cassettes and stereo cartridges are typically manually introduced into a playback device which automatically threads the tape onto a tape pathway which includes a playback head. Numerous self-threading devices have been devised which in most cases require no critical threading time criterion to be met. However, for broadcast or studio quality playback devices it is a critical requirement that self-threading occur within specified time limits. For example, in U.S. Pat. No. 3,720,794 an automated cassette transport is disclosed which includes a self-threading vacuum network designed to take tape from one spool of a cassette and thread it onto an active record/play loop. In order that such a machine provide rapid access to video information recorded on a cassette it is necessary that tape be threaded at a threading speed which approaches the maximum safe linear tape speed; if tape is threaded too slowly rapid access will be lost while overly fast threading will result in damage to the tape. Since linear tape speed is related to both the reel angular velocity and to tape pack diameter it is necessary to determine this diameter to control the linear tape speed unless the linear tape speed is measured directly by means external to the cassette.

In practice, cassettes containing broadcast material will have tape pack diameters which vary within a range of 1 to 3 diameter units. Since threading time is a critical parameter the use of tape delivery measurements external to the cassette itself are not likely to provide prompt enough feedback information due to the inherent time required for the tape to reach the measurement means; a direct measurement of tape pack diameter is desirable so that reel velocity may be controlled in order to deliver tape at a uniform linear tape speed which approaches the maximum safe linear tape speed.

Accordingly it is an object of the present invention to provide a means and method for measuring tape pack diameter of a cassette or stereo cartridge which does not make a measurement external to the cassette or stereo cartridge and which does not employ mechanical followers or an optical system.

It is another object of the present invention to provide a means and method for measuring tape pack diameter by measuring the inertia of the tape on the reel and comparing the inertia with an inertia value representative of the inertia of a tape pack of known diameter.

It is a still further object of this invention to control the angular velocity of the supply reel in accordance with tape pack diameter to permit threading of a self-threading transport at a linear tape speed which approaches a maximum linear tape speed.

SUMMARY OF THE INVENTION

The above and other objects of the present invention are achieved by the means and method described as follows. A standard reel velocity tachometer is attached to the shaft of the reel servomotor. The voltage output of the reel velocity tachometer is passed into a sample and hold circuit so that an electrical quantity representative of the angular acceleration of the servomotor at a specified point in time after the startup of the motor is sampled and stored. This quantity is then transformed into a voltage and compared, using a differential amplifier, with a reference voltage. The reference voltage is the voltage which would be measured if the maximum tape pack diameter reel was encountered and if the reel had experienced an angular acceleration which would deliver tape at a linear speed which approaches the maximum safe linear tape speed. Thus, if the maximum diameter tape pack is on the reel then the voltage from the reel servomotor tachometer at the specified point in time and the reference voltage will be identical. However, if the voltage from the reel servomotor tachometer is greater than the reference voltage the reel has accelerated faster due to the lesser inertia of a less-than-maximum diameter tape pack on the reel. The differential amplifier will then increase the voltage to the motor so that its angular velocity will be increased a sufficient amount to permit the less-than-maximum diameter tape pack to discharge tape at a rate to produce a uniform tape speed which approaches the maximum safe linear tape speed.

The method of the present invention contemplates measuring the transient response of a reel servomotor to an impressed voltage and comparing this transient response to the known response for the maximum tape pack diameter case. Faster acceleration is associated with a lesser pack diameter due to the lower inertia. Since pack diameter is directly proportional to linear tape speed the comparison of the transient response with a maximum pack diameter transient response will relate the instantaneous linear tape speed with a known linear tape speed. This result may then be used, for example, in threading operations to determine an additive voltage required to increase the speed of the servomotor to produce threading at a uniform tape speed which approaches maximum safe linear tape speed.

BRIEF DESCRIPTION OF THE DRAWINGS

For a more detailed understanding of the present invention reference may be had to the accompanying drawings which are incorporated herein by reference and in which:

FIG. 1 is a schematic diagram of an embodiment of the present invention adapted for controlling a self-threading operation;

FIG. 2 is a partial perspective view of a self-threading tape transport illustrating the environment for the embodiment of FIG. 1;

FIG. 3A is a time chart of the energization of the motor of FIG. 1;

FIG. 3B is a time chart of the sampling activity of the sample and hold portion of the circuit of FIG. 1;

FIG. 3C is a time chart of servomotor angular velocity response for the maximum diameter tape pack case and a lesser diameter tape pack;

FIG. 3D is a time chart of a family of corrected angular velocity response curves for the reel servomotor, the curves representing reels having varying tape pack diameters;

FIG. 3E is a time chart of the voltage supplied to the servomotor of FIG. 1 for the case of an angular velocity corrected small diameter tape pack and for the case of an uncorrected maximum diameter tape pack; and FIG. 3F is a time chart of the delivered linear tape speed for the case of an angular velocity corrected small diameter tape pack and for the case of an uncorrected maximum diameter tape pack.

DESCRIPTION OF THE PREFERRED EMBODIMENT

The measurement of tape pack diameter in accordance with the present invention is accomplished by determining the moment of inertia of the system and then making a comparison which eliminates the fixed contributions of the motor shaft, reel drive train and reel. The net moment of inertia of the tape pack is a function of pack mass and pack diameter, the term diameter as it is used in this specification meaning the outer diameter of the tape pack. Thus, a comparison between inertias will produce a comparison of tape pack diameters. Since the angular acceleration is inversely proportional to the inertia, it is convenient to compare the angular acceleration of an unknown diameter tape pack with the angular acceleration for a known diameter tape pack to yield a value for the unknown diameter.

As is well known the moment of inertia of a cylinder about its axis is given by $$\frac{\pi R^4 m a}{2}$$

where
R is the radius
a is the axis length
m is the cylinder mass.

Thus, in the nomenclature of the present invention, since the inner diameter of the tape pack is fixed for a particular reel, the moment of inertia of the tape pack is proportional to the fourth power of tape pack diameter. But the inherent inertia of the system due to the motor shaft, reel drive train and reel is much greater than the inertia of the tape pack. Thus, the fourth power relationship between tape pack diameter and moment of inertia appears as an approximately linear relationship when tape pack inertia is added to the inherent fixed inertia. Thus in the embodiment of FIG. 1 the tape pack inertia is treated as approximately linearly proportional to tape pack diameter. Then since angular acceleration is inversely proportional to the moment of inertia, the angular acceleration of the tape pack is approximately inversely proportional to the tape pack diameter. While this approximation is utilized in the embodiment of FIG. 1, it is merely a convenient way of comparing the inertia of an unknown diameter pack with the inertia of a known diameter pack. Other techniques such as the direct measurement of inertial torque may be employed.

In the embodiment of FIG. 1 an electrical quantity, e.g. voltage, representative of the instantaneous angular velocity of the reel servomotor 10 is measured from start-up to a preselected point in time and is then stored. This stored quantity, a measure of the angular acceleration, is then compared with the value for the same electrical quantity which is representative of the expected angular acceleration for the known maximum diameter tape pack. To accomplish this measurement, storage and comparison a single command signal, e.g. "thread" as shown in FIG. 3A is introduced at terminal 7 in coincidence with the initial energization of servomotor 10 at terminals 8 and 9. The command signal activates one-shot pulse generator 30 which generates a pulse for a time period $t_1$, as shown in FIG. 3B. For purposes of this disclosure time $t_0$ may be assumed to be zero. For the duration of this period field effect transistor 17 is rendered conductive so that the voltage output of differential amplifier 12, representative of the instantaneous angular velocity of servomotor 10, is continuously stored in capacitor 18, which operates as a sample and hold. Differential amplifier 12 is connected to the two output terminals of tachometer 11 by way of resistors 13 and 14. Feedback resistor 15 is connected between resistor 13 and the output of amplifier 12. Resistor 16 is connected between resistor 14 and ground. The charge is a measure of servomotor angular acceleration. During the pulse period $t_1$, switch 21, whose rest position is across terminals 23 and 24, is activated by the pulse generator 30 to connect terminals 22 and 24.

While the "thread" command is introduced to terminal 7 a similar command is introduced to terminal 6 to throw switch 33 across terminals 36 and 34; an "unthread" command, as described infra, would throw switch 33 across terminals 36 and 35. Thus, while an electrical quantity, e.g. voltage, representative of the instantaneous angular velocity of the servomotor 10 is being measured and stored in capacitor 18 the servomotor is driven by a voltage determined by the reference voltage $-V_R$. The value of $-V_R$ is selected to drive servomotor 10 at a steady state angular speed which would allow a maximum diameter tape pack to deliver tape at a uniform linear tape speed which approaches the maximum safe linear speed.

The charge stored in capacitor 18 at the end of the time period $t_1$ is representative of the angular acceleration of servomotor 10 between time $t_0$ and time $t_1$. The voltage level on capacitor 18 at the end of period $t_1$ is a direct indication of angular velocity of the servomotor 10 at the time $t_1$, which is directly proportional to the servomotor's angular acceleration during the period. If $t_1$ occurs before the system has achieved steady state operation then the angular acceleration is simply the angular velocity value divided by the period $t_1$. If $t_1$ occurred after the system reaches steady state generation it would not be possible to obtain an accurate measurement of angular acceleration since there would be no way of knowing how long the system had been operating in its steady state. It is desirable to choose $t_1$ as close to the attainment of steady state operation in order to obtain optimum gain, i.e., to most accurately determine the angular acceleration. As set out above this angualr acceleration is inversely related to the tape pack diameter. It would be possible to devise circuitry to compare at this point this angular acceleration with the expected angular acceleration for a known tape pack diameter to produce a direct readout of tape pack diameter. However, in the particular threading application of the embodiment of FIG. 1 only a relative determination of tape pack diameter is required with maximum tape pack diameter as a reference. At time $t_1$ when the output of one shot pulse generator 30 returns to zero and switch 21 returns to its normal state to connect terminal 23 and 24, the voltage held on capacitor 18 is amplified by differential amplifier 19 and then transmitted by switch 21 and terminal 25 to the servomotor loop to drive servomotor 10. The gain introduced by amplifier 19 and the value of bias resistor 20 are set in accordance with the angular acceleration — tape pack diameter relationships set out above. The step in acceleration of servomotor 10 at time $t_1$ and the attainment of a sufficiently high angular velocity is shown by the family of angular velocity versus time curves 47, 48 and 49 of FIG. 3D which are explained below in detail.

The end of the threading cycle may be ascertained by reaching a cutoff time $t_2$, as shown in FIGS. 3A-F, at which time servomotor 10 is de-energized and braked, or may be triggered by a sensor which senses tape position and indicates to the reel servo loop that the tape transport has been threaded. In any event the cutoff of the "thread" command to terminal 7 will eliminate the negative holding voltage from inverse amplifier 31 which rendered field effect transistor 32 nonconductive during the servomotor startup cycle. With field effect transistor 32 conductive the charge on capacitor 18 passes to ground and the embodiment of FIG. 1 is ready for reemployment. Such reemployment will most likely come on unthreading of the tape transport. On unthreading an "unthreading" command is introduced at terminal 7 and the circuit functions as outlined above with the voltage output of differential amplifier 12 and the charge stored in capacitor 18 representing the instantaneous angular velocity of servomotor 12 as it rotates in the opposite direction. The "unthreading" command is also introduced to terminal 6 so that switch 33 closes across terminals 35 and 36. The reference voltage at the start of unthreading is $+V_R$ whose value is selected so that a maximum diameter tape pack will retrieve tape at a linear tape speed which approaches maximum safe linear tape speed. The reversal of voltage polarity from that employed in the startup cycle causes the servomotor 10 to rotate in a direction opposite to the thread direction. At the end of the time period $t_1$ the comparison with possible addition of a step voltage occurs as set out above for the thread mode.

FIG. 2 illustrates a self-threading tape transport 60 of the type disclosed in U.S. Pat. No. 3,720,794. It is in this environment that the embodiment of FIG. 1 is operative. Professional signal broadcast and studio practices require short clips of video and audio material to be interleaved in precise time sequence. A cassette 77 from a suitable storate unit (not shown) is transported to a threading station 76 at which a supply reel hub 74 and take-up reel hub 73 are engaged by appropriate spindle means such as take-up reel spindle 75 driven by servomotor 10 by way of belt 72. Control circuitry 61, which includes an embodiment of the present invention, emits a "thread" command which activates a vacuum source 62 and take-up reel servomotor 10. Tape 63 is drawn by the force of the vacuum past air lubricated guide posts 67, heads 64, video head drum 65 and retractable capstan 66 into vertical column 68 and horizontal finger 69 of the tape transport 60 until the tape transport 60 has been fully threaded. The threading sequence will terminate either when the servomotor 10 has operated for a specified period or when the tape passes photosensor (not shown) at the upper end of column 68. Since the threading time is a critical parameter of the precision interleaving of video material this threading must be accomplished with the tape moving at a linear tape speed approaching the maximum safe linear tape speed. This maximum safe speed is slightly below the speed at which the tape would be damaged or would bunch up in the transport. Uniform threading is accomplished by driving the servomotor initially at an angular speed which would produce the maximum safe tape speed for the maximum diameter pack of tape. If a greater angular acceleration is sensed by tackometer 11 and control circuit 61 due to the lower inertia of a lesser diameter tape pack the angular velocity of the servomotor will be increased to an angular velocity which will deliver the tape at a linear tape speed which approaches maximum safe linear tape speed.

In an embodiment of the present invention not shown in the drawings the tape pack diameter is nearly instantaneously determined during continuous operation. An incremental increase in voltage is introduced to the servomotor loop. As the servomotor accelerates its transient response is sampled, stored and compared to a reference voltage as described above. The tape pack diameter is displayed on a visual indicator and, in further alternative embodiments, is used as a coarse tape speed adjustment and as a double check for prerecorded clocking pulses.

The response of servomotor 10 of FIG. 1 during a tape threading operation is shown in FIGS. 3C-F. With an impressed voltage of $-V_R$ the angular velocity of the take-up reel servomotor as a function of time for the maximum tape pack diameter is shown as dotted line 51 in FIG. 3C; with the same voltage the angular velocity of the minimum tape pack diameter case is shown by curve 50. Servomotor transient responses for the range of tape pack diameters would fall between these curves, providing a voltage of $-V_R$ is used.

The family of curves in FIG. 3D illustrates angular velocity curves as a function of time which are corrected to obtain a linear tape speed which approaches maximum safe linear tape speed for tape pack diameters varying from maximum tape pack diameter, curve 49, to minimum tape pack diameter, curve 47. At time $t_1$ the slope of each angular velocity curve, e.g. the angular acceleration, is sensed in accordance with the means set out above or the method set out below. The sensed angular acceleration is compared with the expected angular acceleration for the maximum tape pack diameter. If the angular acceleration is greater than the expected angular acceleration the voltage to the servomotor is increased in inverse proportion to the diameter of the lesser diameter tape pack. The increase in voltage further increases angular acceleration, as indicated by the steeper slopes of curves 48 and 47 after time $t_1$, so that the linear tape speed approaches maximum safe linear tape speed. The angular velocity varies within a range of three, curve 47, to one, curve 49, since tape pack diameter varies within a range of one, curve 47 for minimum diameter, to three, curve 49 for maximum diameter.

The voltage supplied to the servomotor is shown by curve 55 in FIG. 3E, for the maximum pack diameter case, and by curve 54 for the case of angular velocity curve 48 which is corrected to obtain appropriate linear tape speed. In FIG. 3F the linear tape speed for the maximum diameter case is shown as curve 56. The linear tape speed increases until it approaches the maximum safe linear tape speed and then remains constant until the tape is threaded; there is no need to add an incremental voltage to the servomotor for the maximum pack diameter case. Linear tape speed for a less-than-maximum pack diameter case is shown in curve 57. The tape accelerates up to point $t_1$. When the angular acceleration is sensed to be greater than that for the maximum diameter case, thus detecting a lower inertia, lesser diameter tape pack, a step voltage is added to the servomotor circuit so that the angular velocity is increased an amount sufficient to produce a linear tape speed approaching maximum safe linear tape speed as shown.

The method of the present invention may be implemented in several ways including the circuitry set out above. The method contemplates making a determination of tape pack diameter by observing the transient response of the servomotor during acceleration. The transient servomotor response is a function of net tape pack inertia which is related to the tape pack diameter as set out above. Once the reel hub has been attached to the servomotor spindle the steps of the method include (1) applying a step voltage to the servomotor; (2) detecting the transient response of the servomotor to the applied step voltage, i.e., the angular acceleration or response of servomotor angular velocity as a function of time; (3) comparing the transient response with a reference response for a known diameter tape pack to determine tape pack diameter in accordance with the relationship set out above. Knowledge of the tape pack diameter may be used in a feedback loop for various purposes; for example when the method of the present invention is used to accomplish a rapid self-threading operation the following step is added (4) increasing servomotor voltage in inverse proportion to tape pack diameter to effect delivery of tape at a linear tape speed approaching the maximum safe linear tape speed. Since the reverse of the method set out above is also within the scope of the present invention the steps of the method for the deceleration case include (1) removing a step voltage from a servomotor; (2) detecting the transient response of the servomotor to the removed step voltage, i.e., the angular deceleration or response of angular velocity as a function of time; and (3) comparing the transient response with a reference response for a known diameter tape pack to determine tape pack diameter in accordance with the relationships set out above. Under either acceleration or deceleration a direct visual readout of tape pack diameter may also be obtained or a value for linear tape speed derived from tape pack diameter and servomotor angular velocity may be used as a coarse check on a prerecorded clocking pulse.

While specific embodiments of the present invention have been described herein the invention is intended to be limited solely by the scope and spirit of the appended claims.

We claim:
1. A method of measuring the tape pack diameter of a reel of tape driven by a reel servomotor, comprising:
    measuring the inertia of a first tape pack, and
    comparing said inertia with an inertia value representative of the inertia of a second tape pack of known diameter to determine the diameter of said first tape pack.

2. A method of measuring an unknown tape pack diameter of a reel of tape driven by a reel servomotor, comprising:
    1. applying a step voltage to said servomotor;
    2. detecting the transient response of said servomotor to said applied step voltage; and
    3. comparing said transient response with a reference transient response for a tape pack of known diameter to determine said unknown tape pack diameter.

3. A method of measuring tape pack diameter in accordance with the method of claim 2 wherein said detection of said transient response is accomplished by generating a first electrical quantity representative of the angular acceleration of said servomotor at a point in time subsequent to the application of said step voltage but prior to attainment of steady state operation and wherein said comparison of said transient response with said reference transient response is accomplished by comparing said first electrical quantity with a second electrical quantity representative of the angular acceleration that a known diameter tape pack would have achieved at said point in time.

4. A method of measuring tape pack diameter in accordance with claim 3 wherein said known diameter tape pack has the maximum expected diameter.

5. A method of measuring tape pack diameter in accordance with the method of claim 4 wherein said point in time is chosen to be slightly prior to the time at which a minimum diameter tape would attain steady state operation in order to maximize gain.

6. A method of measuring tape pack diameter in accordance with the method of claim 5 further comprising the step of
    4. increasing the step voltage to said servomotor at said point in time if a less-than-maximum pack diameter is sensed so that tape is delivered from said reel at a uniform tape speed which approaches maximum safe linear tape speed.

7. A method of measuring an unknown tape pack diameter of a reel of tape driven by a reel servomotor, comprising:
    1. removing a step voltage from said servomotor while said servomotor is in operation;
    2. detecting the transient response of said servomotor to the removal of said step voltage; and
    3. comparing said transient response with a reference transient response for a tape pack of known diameter to determine said unknown tape pack diameter.

8. A system for measuring the tape pack diameter of a reel of tape driven by a reel servomotor, comprising:
    means for measuring the inertia of a first tape pack; and
    comparison means for comparing said first tape pack inertia with an inertia value representative of the inertia of a second tape pack of known diameter to determine the diameter of said first tape pack.

9. A system of measuring tape pack diameter in accordance with claim 8 wherein
said means for measuring the inertia of said first tape pack comprises:
means for applying a step voltage to said servomotor;
tachometer means for producing a first electrical quantity representative of the angular acceleration of said servomotor at a point in time subsequent to the application of said step voltage but prior to attainment of steady state operation; and
said comparison means comprises
a means for comparing said first electrical quantity with a second electrical quantity representative of the expected angular acceleration of said second tape pack of known diameter to determine the diameter of said first tape pack.

10. A system of measuring tape pack diameter in accordance with claim 9 wherein said first and second electrical quantities are voltage.

11. A system of measuring tape pack diameter in accordance with claim 10 wherein said means for comparing said first electrical quantity with said second electrical quantity includes a sample and hold circuit which samples said first voltage up to said point in time and holds a capacitive charge representing said first voltage at said point in time, and a differential amplifier whose input is taken from said voltage represented by said capacitive charge and whose output is utilized to energize said servomotor from said point in time to servomotor shutoff, the gain on said differential amplifier being set so that said servomotor reaches a uniform linear tape speed which approaches maximum safe linear tape speed.

\* \* \* \* \*